Oct. 7, 1930.  E. R. HOLMES  1,777,368
PICKING MOTION FOR LOOMS
Filed Jan. 14, 1930  2 Sheets-Sheet 2
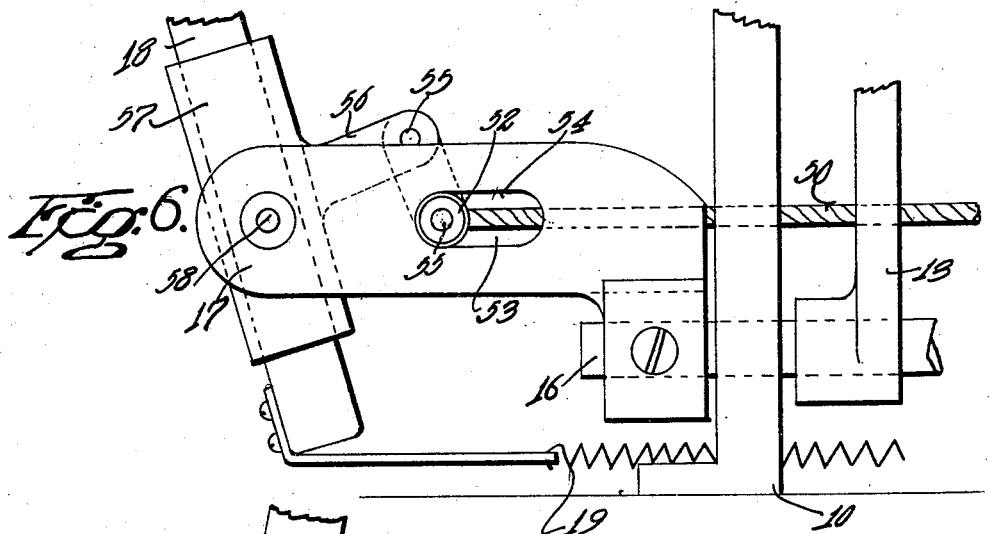
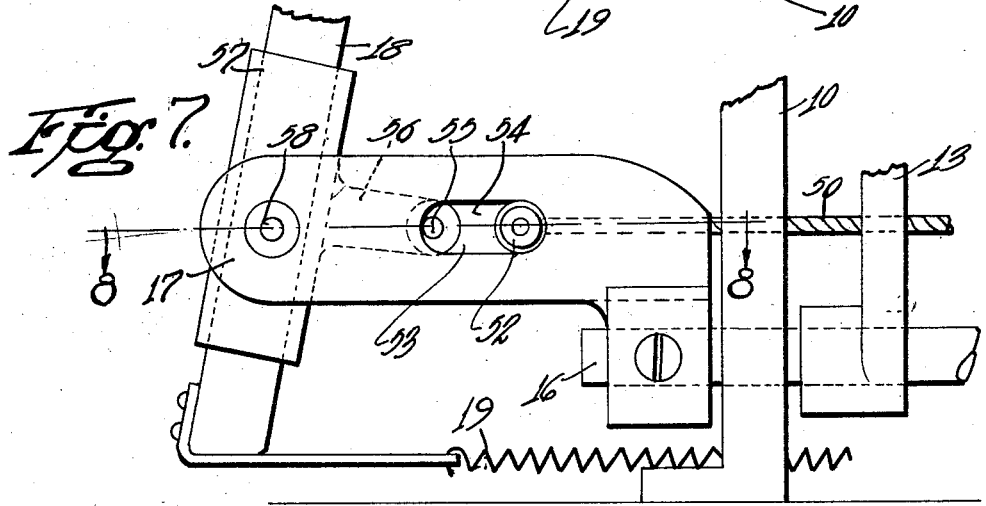
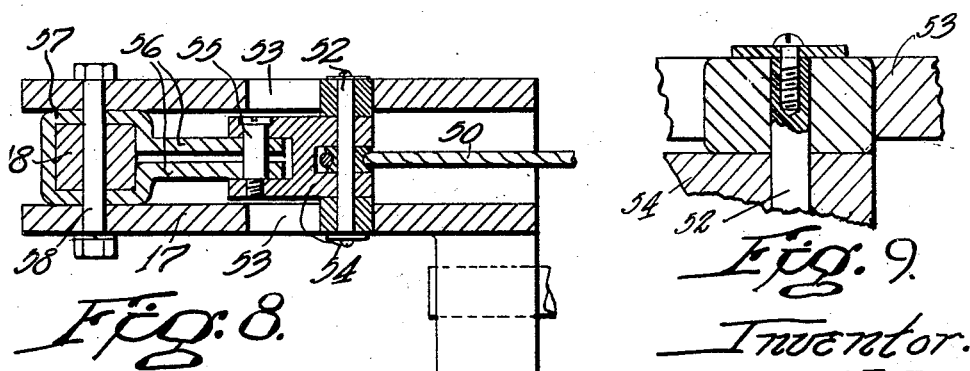
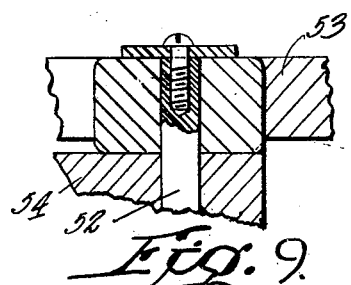
Inventor:-
Elbridge R. Holmes Patented Oct. 7, 1930

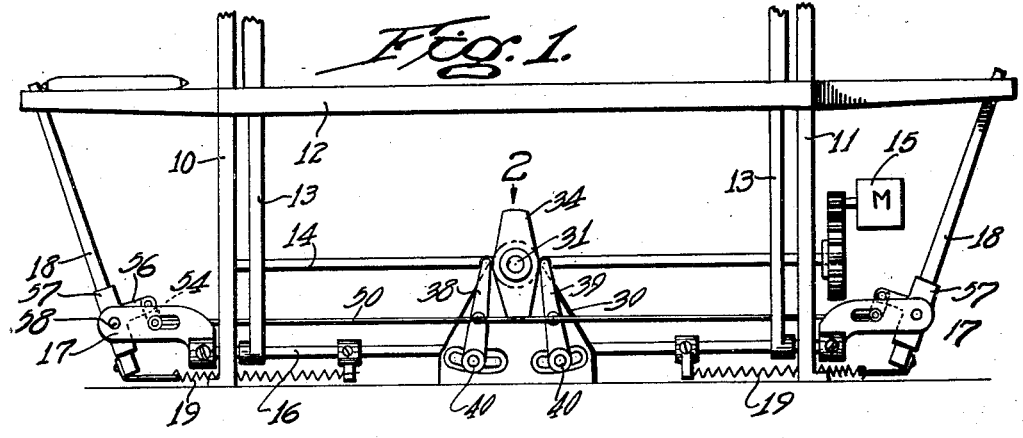
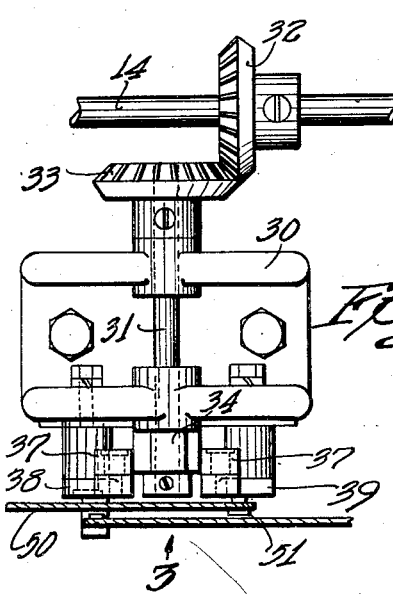
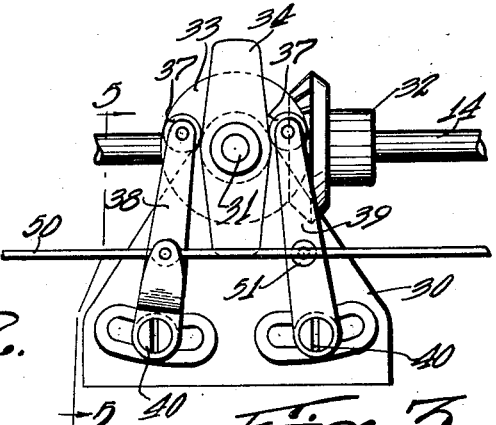
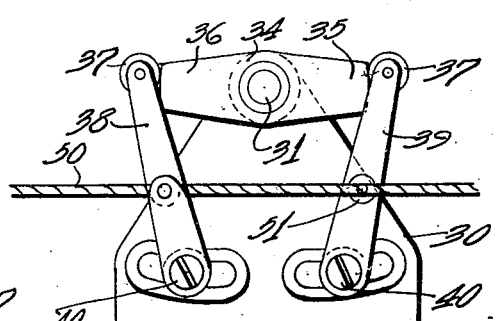
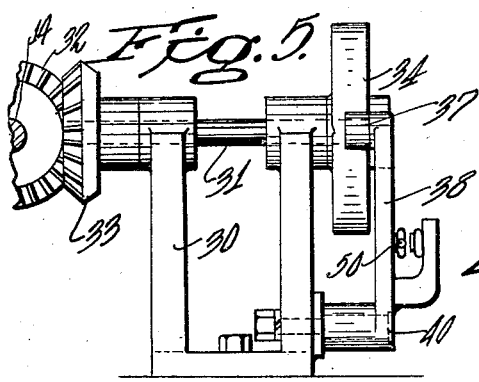

1,777,368

UNITED STATES PATENT OFFICE

ELBRIDGE R. HOLMES, OF WORCESTER, MASSACHUSETTS, ASSIGNOR TO CROMPTON & KNOWLES LOOM WORKS, OF WORCESTER, MASSACHUSETTS, A CORPORATION OF MASSACHUSETTS

PICKING MOTION FOR LOOMS

Application filed January 14, 1930. Serial No. 420,788.

This invention relates to improvements in picking motions for looms and it is the general object of the invention so to actuate the picker stick that the operating connections therefore will prevent overthrow or excess movement at the end of the picking stroke.

In the usual form of fly shuttle loom the picker stick is pivoted to a part carried by the lay near the pivot of the latter and is swung inwardly toward the cloth by some form of cam driven preferably from the bottom shaft. The connections customarily employed between the cam and the stick are so constructed as to permit the latter to continue its motion after the work of the cam is completed, which results in shock and noise. It is an important object of my present invention to provide a system of linkage between the picker stick and the cam such that when the picker stick has reached its inmost position under influence of the cam said linkage will tend to tighten the connection between the cam and the stick should the latter tend to overthrow, this tightening resisting excess movement of the stick.

It is a further object of my present invention to provide a series of links which at the beginning of the picking stroke are out of alignment but which as the stick motion continues assume more and more a straight line, until at the end of the picking stroke said links form a straight line which passes through the pivot of the picker stick. The result of this construction is that any effort on the part of the stick to override will move the links to a broken line of some form other than straight. This deformation of the line joining the links could be accomplished only by a shortening of the distance between the picker stick pivot and the source of power or the cam contact with the system, and as such shortening is impossible the overriding tendency of the picker stick is effectively checked.

With these and other objects in view which will appear as the description proceeds, my invention resides in the combination and arrangement of parts hereinafter described and set forth in the claims.

In the accompanying drawings, wherein a convenient embodiment of my invention is set forth, Fig. 1 is a front elevation of a loom made according to my present invention, Fig. 2 is a top plan view on an enlarged scale of the cam and associated parts, taken in the direction of arrow 2, Fig. 1, Fig. 3 is a front elevation taken in the direction of arrow 3, Fig. 2, Fig. 4 is a view similar to a portion of Fig. 3 but with the driving arms moved to picking position, Fig. 5 is a vertical section on line 5—5 of Fig. 3, Fig. 6 is an enlarged front elevation of the lower end of the picker stick and associated rocker foot, together with certain parts for actuating the picker stick, showing the latter in non-picking or normal position, Fig. 7 is a view similar to Fig. 6 but with the picker stick moved to picking position, Fig. 8 is a detailed horizontal section on line 8—8 of Fig. 7, and Fig. 9 is a detailed view on an enlarged scale showing portions of the mechanism shown in Fig. 8.

Referring to Fig. 1, I have shown a loom having sides 10 and 11 and a lay 12 mounted on swords 13, the bottom shaft 14 of the loom being driven through appropriate gearing by means of a motor indicated at 15. The swords 13 may be mounted on rocker shaft 16 journaled on the loom frame and each end of said shaft may have secured thereto a rocker foot 17 which supports a picker stick 18. The latter may have the lower portion thereof acted on by means of a spring 19 which retracts the picker stick to the normal position shown in full lines in Fig. 1. Except as hereinafter noted the parts thus far described are of usual construction.

In carrying my invention into effect I provide a central part of the loom with a stand 30 in which is journaled a horizontal cross or stub shaft 31, the axis of which is substantially perpendicular to the shaft 14. The latter is provided with a bevel gear 32 which meshes with a similar gear 33 fixed to the shaft 31. In this way the stub shaft 31 is given a revolution every alternate pick of the loom.

The forward end of the stub shaft has secured thereto a picking cam 34 having points 35 and 36 as set forth in Figs. 3 and 4. These points are preferably oppositely disposed with respect to the axis of the stub shaft and cooperate with rollers 37 carried by left and right picking levers 38 and 39, respectively. The latter are pivoted on studs 40 adjustably located in the frame or stand 30.

Inasmuch as the picking mechanism at each end of the loom is the same I will describe but one of these devices, namely, that shown at the left hand side of Fig. 1.

The picker lever 39 is attached to a connector 50 as by stud 51 and extends to the left, being attached as shown in Fig. 8 to a cross head 52 slidable in slots 53 formed in the rocker foot 17. A link 54 is pivoted to the cross head and supports a stud 55 which passes through the arms 56 of a picker stick holder 57. The latter is pivotally connected as at 58 to the rocker foot 17 by means of a bolt and the latter also passes through the picker stick 18, thereby affording support for the picker stick and its holder on the rocker foot.

In operation, the cam will be given a complete revolution every other pick of the loom so that on each pick both of the levers 38 and 39 will be actuated, this condition existing in so-called pick and pick looms. If desired, any other form of gearing than that shown herein may be employed for giving the picker levers their actuating strokes, as for instance on alternate beats of the loom. When one or another of the points 35 or 36 moves lever 39 from the position shown in Fig. 3 to that shown in Fig. 4 the link 50 will be given a movement to the right. This moves the cross head 52 to the right, causing the stud 55 and the arms 56 to move downwardly. As the lever 39 assumes its extreme position to the right the cross head 52, stud 55 and bolt 58 will be in a straight line which passes through the stud 51.

When the parts reach this position any tendency on the part of the picker stick to continue its motion beyond that shown in Fig. 7 would move the stud 55 downwardly, the effect of which would be to exert a pull to the left on the link 50. This pull is resisted by the roller 37 being in contact with a cam point, and from this relation it will be seen that the cam effectively arrests excess movement of the picker stick, determining within very close range the sweep of the picker stick.

It is to be understood that a corresponding action takes place with regard to the mechanism located at the right hand side of the loom whenever the picker lever 38 is moved to the left by the cam. I find that when the parts are substantially as shown the picker stick is given the proper motion to impart to the shuttle the desired degree of acceleration.

From the foregoing it will be seen that I have provided a simple form of picking mechanism wherein the linkage interposed between the picking lever and the picker stick is such as to limit inward motion of the picker stick to prevent overriding movement thereof. It will be seen more particularly that I have provided linkage including a plurality of jointed elements between the picker stick pivot and the actuating lever so arranged that said elements constitute a straight line when the picker stick is at its inmost position, the effect of this relation being to arrest movement of the picker stick. It will further be seen that adjustments may be made in the location of the pivots of the levers to compensate for any lost motion which may exist in the linkage.

Having thus described my invention it will be seen that changes and modifications may be made therein by those skilled in the art without departing from the spirit and scope of the invention and I do not wish to be limited to the details herein disclosed, but what I claim is:

1. In a loom picking motion, a picker stick, a pivot for the picker stick, an actuator movable through a prescribed path, and a system of jointed links interposed between the actuator and picker stick to transmit movement from the actuator to the stick, said links being so constructed as to form substantially a straight line passing through the pivot of the picker stick when the actuator has reached the end of its picker stick propelling movement.

2. In a loom picking motion, a picker stick, a pivot for the picker stick, an actuator for the stick movable throughout a prescribed path and having a picker stick propelling movement, and a system of links interposed between the actuator and picker stick, said links normally constituting a non-straight connection between the actuator and the picker stick, said links being moved so as to assume a straight line which passes through the pivot of the picker stick when the actuator reaches the end of its picker stick propelling movement.

3. In a loom picking motion, a picker stick, a pivot for the picker stick, a picker element movable with the picker stick, an actuating member moving the element positively in one direction to give the picker stick a shuttle propelling movement, a system of links interposed between the picker stick and the element, and jointed connections between said links and the picker stick and also the element, said connections being normally out of alignment and being movable into a line which passes through the pivot of the picker stick at the end of the picker stick propelling movement.

4. In a loom picking motion, a picker stick, a pivot for the picker stick, an actuator having a shuttle propelling movement in one direction, a system of links, pivots connecting the links together and connecting one of said links with the actuator and operatively connecting the other link with the picker stick, said pivots being normally out of alignment, and means to cause said pivots to move into a line which passes through the pivot of the picker stick when the actuator reaches the end of its picker stick propelling movement.

5. In a loom picking motion, a picker stick, a pivot for the picker stick, an actuator having a shuttle propelling movement in one direction, a system of links, pivotal connections to connect the links together, a connection to attach one of the links to the actuator, a second pivotal connection to connect another of the links operatively to the picker stick, a guide for one of said pivotal connections along which the latter may slide, said guide being fixed in relation to the pivot of said picker stick and said connections being normally out of alignment but being movable into substantially a straight line which passes through the pivot of the picker stick when the actuator reaches the end of its picker stick propelling movement.

6. In a loom picking motion, a picker stick, a pivot for the picker stick, an actuator, mechanism to give said actuator a progressive picker stick propelling movement in one direction, said mechanism to be operatively related to the actuator throughout the picker stick propelling movement of the latter, a link pivotally connected to the actuator, another link operatively connected to the picker stick, a pivotal connection between said other link and the picker stick, a sliding and pivotal connection between the links, and a guide for said sliding and pivotal connection along which the latter moves, said guide being fixed in relation to the pivot of said picker stick and said guide preventing movement of the sliding and pivotal connection in a direction lateral with respect to the sliding movement thereof, the pivotal connections being normally out of alignment and movable into a straight line passing through the pivot of the picker stick when the actuator reaches the end of its picker stick propelling movement, said mechanism preventing retrograde movement of the actuator and thereby preventing overriding movement on the part of the picker stick.

7. In a loom picking motion, a picker stick, a pivot for the picker stick, an actuator, mechanism to give the actuator a picker stick propelling movement in one direction and to prevent return movement of the actuator immediately after the completion of the picker stick propelling movement, a system of jointed links interposed between the actuator and the picker stick, said links normally having their joints out of a straight line, said links being movable so that the joints thereof are in substantially a straight line passing through the pivot of the picker stick when the actuator reaches the end of the picker stick propelling movement thereof.

8. In a loom picking motion, a picker stick, a pivot for the picker stick, an actuator, mechanism to give the actuator a picker stick propelling movement in one direction and to prevent return movement of the actuator immediately after the completion of the picker stick propelling movement, an arm secured to the picker stick, a pair of links one of which is operatively connected to the actuator, a pivotal connection between the other link and the arm, the links being normally so disposed that the line joining the pivot of the picker stick and the pivotal connection is out of alignment with one of the links, said links being moved as the actuator nears the end of its picker stick propelling stroke to move the links and said pivotal connection into a straight line which passes through the pivot of the picker stick.

9. In a loom picker motion, a picker stick, a pivot for the picker stick, an actuator, mechanism to give the actuator a picker stick propelling movement in one direction and to prevent return movement of the actuator immediately after the completion of the picker stick propelling movement, an arm secured to the picker stick, a transmitter of power interposed between the actuator and the arm, and a connection between the transmitter and the arm, said connection normally being out of line with the pivot of the picker stick and the actuator, said connection moving into alignment with the pivot of the picker stick and the actuator when the actuator nears the end of its picker stick propelling movement.

10. In a loom picking motion, a picker stick, a pivot for the picker stick, an actuator, mechanism to give the actuator a picker stick propelling movement in one direction and to prevent return movement of the actuator immediately after the completion of the picker stick propelling movement, an arm secured to the picker stick, a pair of links one of which is operatively connected to the actuator, a pivotal connection between the other link and the arm, the links being normally so disposed that the line joining the pivot of the picker stick and the pivotal connection is out of alignment with the link operatively connected to the actuator, said links being moved as the actuator nears the end of its picker stick propelling stroke so as to form with said pivotal connection in a straight line which passes through the pivot of the picker stick.

11. In a loom picking motion, a picker stick, a pivot for the picker stick, an actuator for the picker stick having a picker stick propelling movement in one direction and held against return movement immediately after completing its picker stick propelling movement, a connection spaced from the pivot of the picker stick and fixed with respect to the latter and a power transmitting member operatively interposed between the actuator and the fixed connection, the said member normally being out of line with the line joining the pivot of the picker stick and the fixed connection, said connection moving as the actuator completes the end of its picker stick propelling movement so that the line joining the pivot of the picker stick and the fixed connection is in substantial alignment with the member.

12. In a loom picking motion, a picker stick, a pivot for the picker stick, an actuator for the picker stick having a picker stick propelling movement in one direction and held against return movement immediately after completing its picker stick propelling movement, a connection spaced from the pivot of the picker stick and fixed with respect to the latter, means defining a point of attachment for the actuator and a power transmitting member connecting the point of attachment of the actuator with the connection fixed with respect to the picker stick, the path joining the pivot of the picker stick to said point of attachment and passing through said connection being normally other than straight but said points moving to positions as the actuator completes its picker stick propelling movement such that said path then becomes substantially straight.

In testimony whereof I have hereunto affixed my signature.

ELBRIDGE R. HOLMES.